Feb. 13, 1962 A. D. BRUCE ET AL 3,020,874
DEVICE FOR RECORDING OR REGISTERING SHOCK
Filed Oct. 26, 1959 2 Sheets-Sheet 1

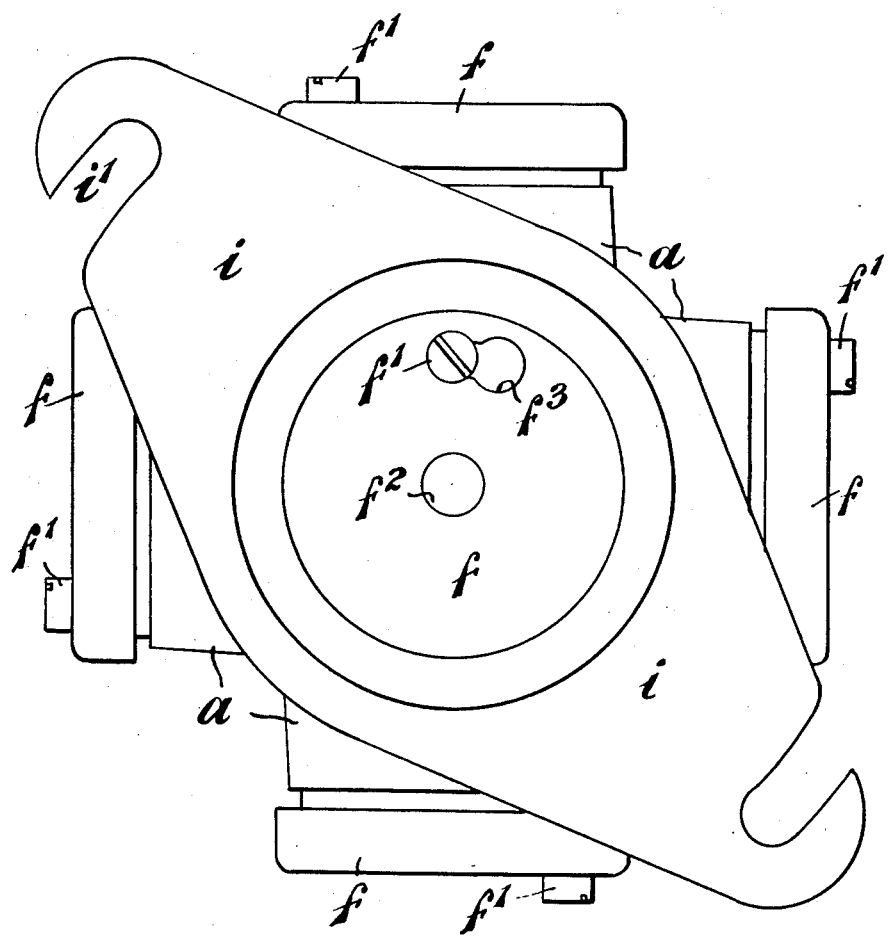

United States Patent Office 3,020,874
Patented Feb. 13, 1962

3,020,874
DEVICE FOR RECORDING OR REGISTERING SHOCK
Alastair Douglas Bruce, Westwood, Bradford-on-Avon, and Charles William Pierce, Hounslow, England, assignors to The Enfield Cycle Company Limited, Redditch, England, a company of Great Britain
Filed Oct. 26, 1959, Ser. No. 848,809
8 Claims. (Cl. 116—114)

The present invention has relation to a device for recording or registering shock, and which is readily attachable to an article about to be transported, the said device having for its purpose to immediately record or register undue shock in any direction to which the article may be subjected during transport or movement with detriment to itself and under all conditions and circumstances, the device being of a simple and readily attachable character which may be pre-set to register any shock in excess of a certain pre-set "$g$" figure.

According to the present invention there is provided a device for recording or registering shock comprising a housing incorporating a spring-loaded plunger or the like, said plunger carrying a needle adapted to pierce a metallic foil disc normally held by the housing in slightly spaced relation from the point of the needle.

Means are provided for readily adjusting the spring loading of the needle to suit particular requirements and one housing body preferably incorporates six needles to record or register shock in opposite directions in three planes.

In order that the invention may be clearly understood and readily carried into practice reference may be had to the appended explanatory drawings in which:

FIGURE 2 is an inverted plan view of the device shown in FIGURE 1, and

Figure 1:
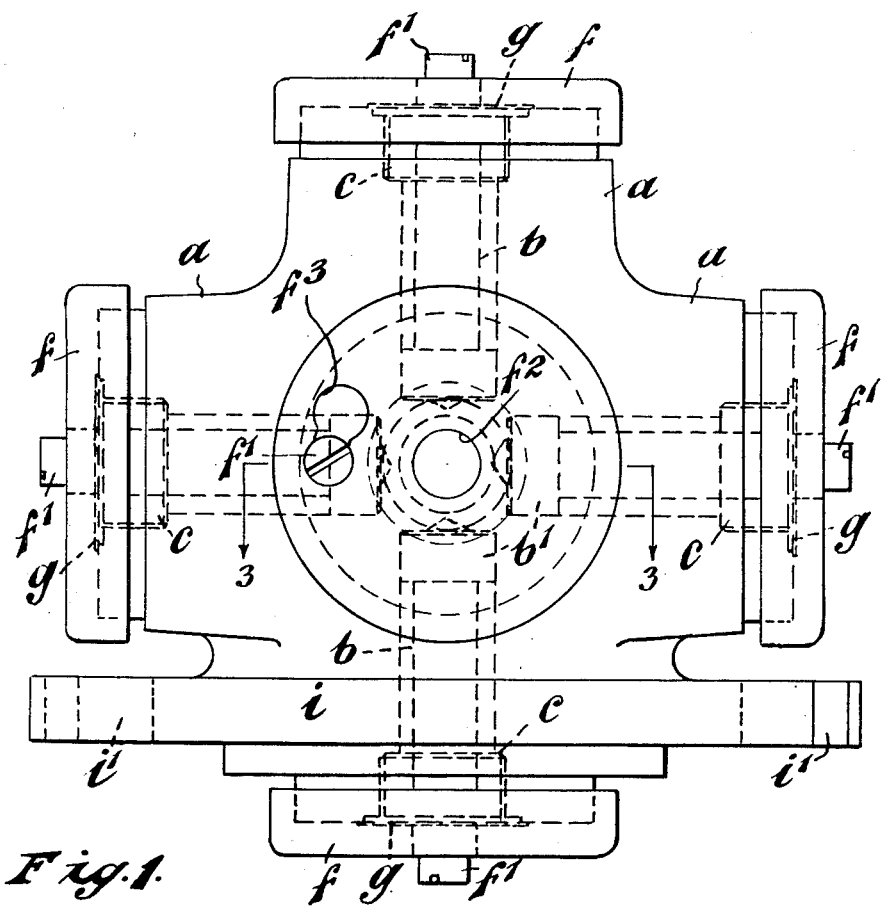
FIGURE 1 illustrates in elevation a device for recording or registering shock in accordance with the present invention.
Figure 3:
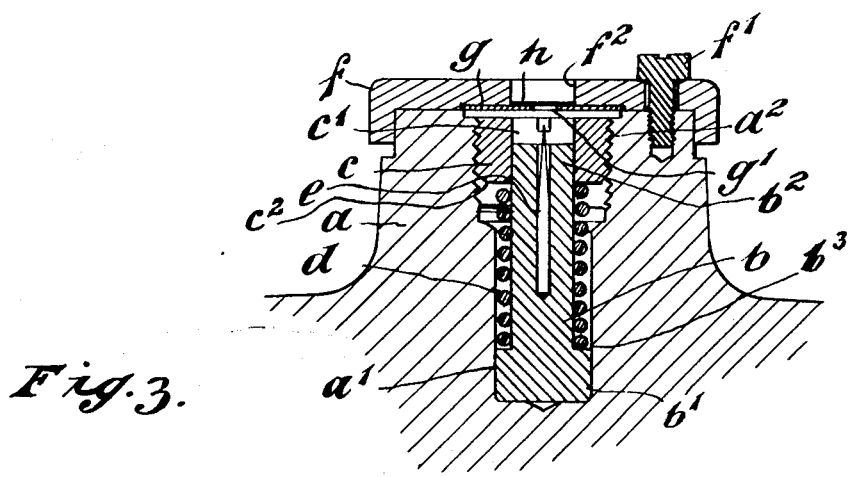

FIGURE 3 a fragmentary vertical sectional elevation taken as indicated by the arrows 3—3 on FIG. 1, and illustrating an operative subcombination of the mechanism.

In a convenient embodiment of the present invention, there is provided a housing $a$ incorporating a tubular blind bore $a^1$ wherein the lower enlarged part $b^1$ of a plunger $b$ is slidably mounted, the upper part $b^2$ being slidably accommodated in a screw plug $c$ which is screwed into an internally threaded cavity $a^2$ connecting with the blind bore $a^1$ and of somewhat larger diameter. Interposed between the plug $c$ and the lower part $b^1$ of the plunger $b$ is a coiled compression spring $d$ surrounding the plunger so that the latter can slide or move slightly under control of the said compression spring $d$, the strength of which is adjustable by rotation of the screwed plug $c$. The degree of compression of spring $d$ and thus the prestressing of that spring tending to bias the plunger $b$ to the bottom of bore $a^1$ and oppose the inertia of $b$ tending to lift it from that bottom is controlled by the depth of the screw plug $c$ in the internally threaded cavity $a^2$, inasmuch as the lower face $c^2$ of the plug $c$ bars against the upper end of the spring $d$ while the lower end of the spring $d$ seats against the shoulder $b^3$ defining the upper limit of the enlarged part $b^1$ of the plunger $b$. Inserted in that part of the plunger removed from its head is a needle $e$. The open part of the housing $a$ is closed by a shallow cup-shaped cap $f$ secured by a cheese head screw $f^1$. The cap $f$ has an aperture $f^2$ in register with the screwed plug bore $c^1$ and clinched between the cap $f$ and the body $a$ of the housing is a metal washer $g$ itself centrally perforated at $g^1$ and a metallic foil disc target $h$ is held in place by the washer $g$ or interposed between the washer and the cap $f$ to cover the aperture $g^1$ in the washer.

It will be appreciated that when the housing is subjected to vibration beyond a predetermined limit the plunger $b$ is displaced and the needle $e$ pierces or marks the metallic foil disc $h$ to record or register the undue shock. The cap $f$ may have a key hole shaped slot $f^3$ facilitating the removal of the cap $f$ for foil replacement purposes.

In order that the shock shall be taken in all directions six housings are involved in three intersecting planes, see FIGURES 1 and 2, and what may be termed the lower part of this multiple housing is provided with an elongated flange member $i$, the extremities of which are oppositely slotted at $i^1$ to facilitate attaching it to structure to be tested.

We claim:

1. Shock recording apparatus, comprising, a housing having a cavity formed therein; plunger means slidably mounted in said cavity; adjustable biasing means for said plunger including spring means bearing against said plunger and screw plug means, having an axially formed aperture, bearing against said spring means; said cavity in said housing being internally threaded to receive said screw plug means; a marker, registering with said aperture in said screw plug, positioned within said cavity and responsive to movement of said plunger; and target means for receiving a mark from said marker means in response to a predetermined movement of said plunger; said target means being removably secured to said housing in registration with said axially formed aperture in said screw plug.

2. Shock recording apparatus, comprising, a housing a cavity formed therein; plunger means slidably mounted in said cavity; adjustable baising means for said plunger including spring means bearing against said plunger and screw plug means, having an axially formed aperture, bearing against said spring means; said cavity in said housing being internally threaded to receive said screw plug means; a marker, registering with said aperture in said screw plug, positioned within said cavity and responsive to movement of said plunger; and metallic foil target means for receiving a mark from said marker means in response to a predetermined movement of said plunger; said target means being removably secured to said housing in registration with said axially formed aperture in said screw plug.

3. Shock recording apparatus, comprising, a housing having a cavity formed therein; plunger means slidably mounted in said cavity; adjustable biasing means for said plunger including spring means bearing against said plunger and screw plug means, having an axially formed aperture, bearing against said spring means; said cavity in said housing being internally threaded to receive said screw plug means; a marker, registering with said aperture in said screw plug, positioned within said cavity and responsive to movement of said plunger; and metallic foil target means for receiving a mark from said marker means in response to a predetermined movement of said plunger; said target means being removably secured to said housing in registration with said axially formed aperture in said screw plug by cap means; said cap means having an aperture formed therein in registration with said axially formed aperture in said screw plug permitting visual inspection of said target for marks from shock.

4. Shock recording apparatus, comprising, a housing having a plurality of pairs of cavities formed therein; a like plurality of pairs of plunger means slidably mounted for movement, one in each of one of said pair of cavities; each pair of cavities supporting their respective pair of plungers for movement in opposite directions; the axial disposition of said pair of plungers defining a line of a plane; the axial disposition of a second pair of said plurality of plungers defining a second line of said plane; said first and second lines intersecting substantially perpendicularly within said plane.

5. Shock recording apparatus, comprising, a housing having a plurality of pairs of cavities formed therein, a like plurality of pairs of plunger means slidably mounted for movement, one in each of one of said pair of cavities; each pair of cavities supporting their respective pair of plungers for movement in opposite directions; the axial disposition of said pair of plungers defining a line of a plane; the axial disposition of a second pair of said plurality of plungers defining a second line of said plane; said first and second lines intersecting substantially perpendicularly within said plane; adjustable biasing means for each of said plungers including spring means bearing against a respective plunger and screw plug means, having an axially formed aperture, bearing against said spring means.

6. Shock recording apparatus, comprising, a housing having a plurality of pairs of cavities formed therein, a like plurality of pairs of plunger means slidably mounted for movement, one in each of one of said pair of cavities; each pair of cavities supporting their respective pair of plungers for movement in opposite directions; the axial disposition of said pair of plungers defining a line of a plane; the axial disposition of a second pair of said plurality of plungers defining a second line of said plane; said first and second lines intersecting substantially perpendicularly within said plane; adjustable biasing means for each of said plungers including spring means bearing against a respective plunger and screw plug means, having an axially formed aperture, bearing against said spring means; each of said cavities in said housing being internally threaded to receive said screw plug means; a marker for each of said plungers, registering with said aperture in a respective screw plug means, responsive to movement of its respective plunger.

7. Shock recording apparatus, comprising, a housing having a plurality of pairs of cavities formed therein, a like plurality of pairs of plunger means slidably mounted for movement, one in each of one of said pair of cavities; each pair of cavities supporting their respective pair of plungers for movement in opposite directions; the axial disposition of said pair of plungers defining a line of a plane; the axial disposition of a second pair of said plurality of plungers defining a second line of said plane; said first and second lines intersecting substantially perpendicularly within said plane; adjustable biasing means for each of said plungers including spring means bearing against a respective plunger and screw plug means, having an axially formed aperture, bearing against said spring means; each of said cavities in said housing being internally threaded to receive said screw plug means; a marker for each of said plungers, registering with said aperture in a respective screw plug means, responsive to movement of its respective plunger; target means for each of said marker means, each being removably secured to said housing in registration with said axially formed aperture in a respective screw plug means.

8. Shock recording apparatus, comprising, a housing having a plurality of pairs of cavities formed therein, a like plurality of pairs of plunger means slidably mounted for movement, one in each of one of said pair of cavities; each pair of cavities supporting their respective pair of plungers for movement in opposite directions; the axial disposition of said pair of plungers defining a line of a plane; the axial disposition of a second pair of said plurality of plungers defining a second line of said plane; said first and second lines intersecting substantially perpendicularly within said plane; adjustable biasing means for each of said plungers including spring means bearing against a respective plunger and screw plug means, having an axially formed aperture, bearing against said spring means; each of said cavities in said housing being internally threaded to receive said screw plug means; a marker for each of said plungers, registering with said aperture in a respective screw plug means, responsive to movement of its respective plunger; metallic foil target means for each of said marker means, each being removably secured to said housing in registration with said axially formed aperture in a respective screw plug means by cap means; said cap means having an aperture formed therein in registration with said axially formed aperture in said respective screw plug means permitting visual inspection of said target for marks from shock.

References Cited in the file of this patent

UNITED STATES PATENTS

| | | |
|---|---|---|
| 1,745,522 | Baskerville | Feb. 4, 1930 |
| 2,250,077 | Henry | July 22, 1941 |
| 2,454,793 | Grogan | Nov. 30, 1948 |
| 2,601,440 | Kerrigan | June 24, 1952 |
| 2,825,297 | Harrison | Mar. 4, 1958 |

FOREIGN PATENTS

| | | |
|---|---|---|
| 687,373 | Great Britain | Feb. 11, 1953 |

UNITED STATES PATENT OFFICE
CERTIFICATE OF CORRECTION

Patent No. 3,020,874            February 13, 1962

Alastair Douglas Bruce et al.

It is hereby certified that error appears in the above numbered patent requiring correction and that the said Letters Patent should read as corrected below.

In the grant, lines 3 and 4, for "assignors to The Enfield Cycle Company Limited, of Redditch, England, a company of Great Britain," read -- said Bruce assignor to The Enfield Cycle Company Limited, of Redditch, England, a company of Great Britain, --; line 13, for "The Enfield Cycle Company Limited, its successors" read -- Charles William Pierce, his heirs or assigns, and The Enfield Cycle Company Limited, its successors --; in the heading to the printed specification, lines 5 to 7, for "assignors to The Enfield Cycle Company Limited, Redditch, England, a company of Great Britain" read -- said Bruce assignor to The Enfield Cycle Company Limited, Redditch, England, a company of Great Britain --.

Signed and sealed this 4th day of September 1962.

(SEAL)
Attest:

ERNEST W. SWIDER            DAVID L. LADD
Attesting Officer            Commissioner of Patents